(12) United States Patent
Robinson et al.

(10) Patent No.: US 8,701,811 B2
(45) Date of Patent: Apr. 22, 2014

(54) BATTERY COOLING SYSTEM AND METHOD

(75) Inventors: James S. Robinson, Delaware, OH (US); Michael W. Maurer, Novi, MI (US); Christopher D. Meeks, Greensboro, NC (US); Jason A. Widmer, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/459,823

(22) Filed: Apr. 30, 2012

(65) Prior Publication Data

US 2013/0284530 A1  Oct. 31, 2013

(51) Int. Cl.
*B60R 1/00* (2006.01)
*B60K 11/06* (2006.01)

(52) U.S. Cl.
USPC ........................................ 180/68.5; 180/68.2

(58) Field of Classification Search
USPC ................................ 180/68.5, 68.2
See application file for complete search history.

(56) References Cited

U.S. PATENT DOCUMENTS

| | | | |
|---|---|---|---|
| 5,320,190 A | 6/1994 | Naumann et al. | |
| 5,392,873 A | 2/1995 | Masuyama et al. | |
| 5,490,572 A * | 2/1996 | Tajiri et al. | 180/65.1 |
| 5,620,057 A | 4/1997 | Klemen et al. | |
| 5,636,701 A | 6/1997 | Norman et al. | |
| 5,681,668 A | 10/1997 | Reed et al. | |
| 5,833,023 A * | 11/1998 | Shimizu | 180/68.5 |
| 6,094,927 A * | 8/2000 | Anazawa et al. | 62/239 |
| 6,155,335 A | 12/2000 | Acre et al. | |
| 6,450,275 B1 * | 9/2002 | Gabriel et al. | 180/65.23 |
| 6,662,891 B2 | 12/2003 | Misu et al. | |
| 6,902,020 B2 * | 6/2005 | Kronner et al. | 180/68.5 |
| 7,004,233 B2 | 2/2006 | Hasegawa et al. | |
| 7,270,346 B2 | 9/2007 | Rowe et al. | |
| 7,686,111 B2 | 3/2010 | Koenekamp et al. | |
| 7,905,307 B2 * | 3/2011 | Kubota et al. | 180/68.1 |
| 8,196,691 B2 * | 6/2012 | Moine-Picard et al. | 180/68.5 |
| 8,215,432 B2 * | 7/2012 | Nemesh et al. | 180/68.2 |
| 8,336,657 B2 * | 12/2012 | Dobbins et al. | 180/68.5 |
| 2008/0196957 A1 | 8/2008 | Koike et al. | |
| 2010/0059208 A1 | 3/2010 | Nakamura | |

FOREIGN PATENT DOCUMENTS

| | | |
|---|---|---|
| JP | 05-169981 | 7/1993 |
| JP | 05-193370 | 8/1993 |

* cited by examiner

*Primary Examiner* — John Walters
(74) *Attorney, Agent, or Firm* — Fay Sharpe LLP

(57) ABSTRACT

A vehicle including a battery residing in a compartment having at least one vented wall. The vehicle further includes an at least partially hollow frame having an air inlet. A conduit extends between the frame and the battery box providing fluid communication therebetween.

21 Claims, 3 Drawing Sheets

BATTERY COOLING SYSTEM AND METHOD

BACKGROUND

The automotive industry has long understood the benefits in protecting motor vehicle batteries from hot under hood temperatures. Moreover, exposure to significantly elevated temperatures can lead to accelerated corrosion of the battery grids and the corresponding reduction in battery life. Conventionally, vehicle batteries are protected by placing an insulating shield around the battery. The shield may include passages to receive cooler air via circulation caused by a fan or vehicle motion which requires ducting to external air through the fascia of the vehicle. This can be an undesirable technique as it can result in a sacrifice of aerodynamic efficiency.

Vehicle frames typically have one or more parallel chassis rails or other frame members which provide structural support for the vehicle. The components of various vehicle systems are mounted to the vehicle frame. For example, components such as an engine, mechanical system components, electrical system components, hydraulic system components, a fuel tank, etc. can be mounted to the vehicle frame. A "C-channel" or other hollow extrusion is often used to form the frame members. Accordingly, it is envisioned that the hollow frame members can serve as a source of external air.

BRIEF DESCRIPTION

Various details of the present disclosure are hereinafter summarized to provide a basic understanding. This summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter.

According to a first embodiment, a vehicle powered by an engine and having a battery compartment including at least one wall having a vent is provided. A battery supplying electrical energy to the engine resides in the battery compartment. The vehicle further includes an at least partially hollow frame having an air inlet. A conduit extends between the frame and the battery compartment providing fluid communication therebetween.

According to a further embodiment, a vehicle including a radiator and a corresponding radiator fan encompassed by a fan shroud is provided. The vehicle further includes a battery and a battery box receiving the battery. The battery box includes a vented wall positioned to receive an airflow exiting the fan shroud. The battery box further includes an inlet in fluid communication with a remote source of air.

According to another embodiment, a method of cooling a battery of a vehicle is provided. The method includes providing a battery box configured to house the battery. At least one at least partially hollow frame rail is also provided having an inlet receiving external air. The frame rail is in a fluid communication with the battery box wherein during operation of the vehicle, external air is provided to the battery box via the frame rail and air is encouraged to exit the battery box by at least one of natural convection and a pressure differential.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

The following description is directed primarily to the automobile, however, without departing from the scope of the disclosure, it is also amenable to other types of vehicles including, but not limited to, motorcycles and multi-purpose utility vehicles. According to a first embodiment, air for cooling a battery in a battery box associated with the vehicle is provided from the vehicle's hollow side frame(s) which extend generally from the front end of the vehicle body to a rear end. Various designs of side frames of this type are known.

For example, the common c-rail frame member, wherein a flat piece of steel is rolled to form a c-shaped beam, can provide a source of airflow. Perhaps an improved source of airflow can be achieved if a boxed frame is employed, wherein two c-rail frame members are welded together or a flat sheet of metal is bent into four sidewalls and welded at the open intersection.

Furthermore, extruded metal tubes of various cross sectional designs may be employed. Extruded tubes can be made from steel or light metal such as aluminum. Interior high-pressure metal forming technology may be employed where the material doubles at the connection surfaces of the hollow sections which are interconnected in a positive-locking manner. Alternatively, it is envisioned that composite materials or a combination of composite and metallic materials may be utilized.

The rail frame members can be a single body or multiple joined sections. For example, separate but joined sections can form the engine compartment region, the sill region, the A-pillar of the support structure of the passenger compartment, and a rear region. A lateral sill can be positioned in the front of the vehicle across the direction of travel, bifurcating an engine compartment and forming a brace therefore. A bulkhead member sill which extends across the direction of travel can also be present.

While several exemplary frame rail constructions have been described, it is noted that the present disclosure is not limited to any particular construction. Rather, any type frame rail capable of channeling external air is suitable.

In summary, the battery cooling is provided via the open side frame(s). Advantageously, a source of cool air is provided without adding a detrimental aerodynamical opening in the vehicle fascia. However, it is envisioned that the frame rails could be extended through the vehicle fascia.

Figure 1:
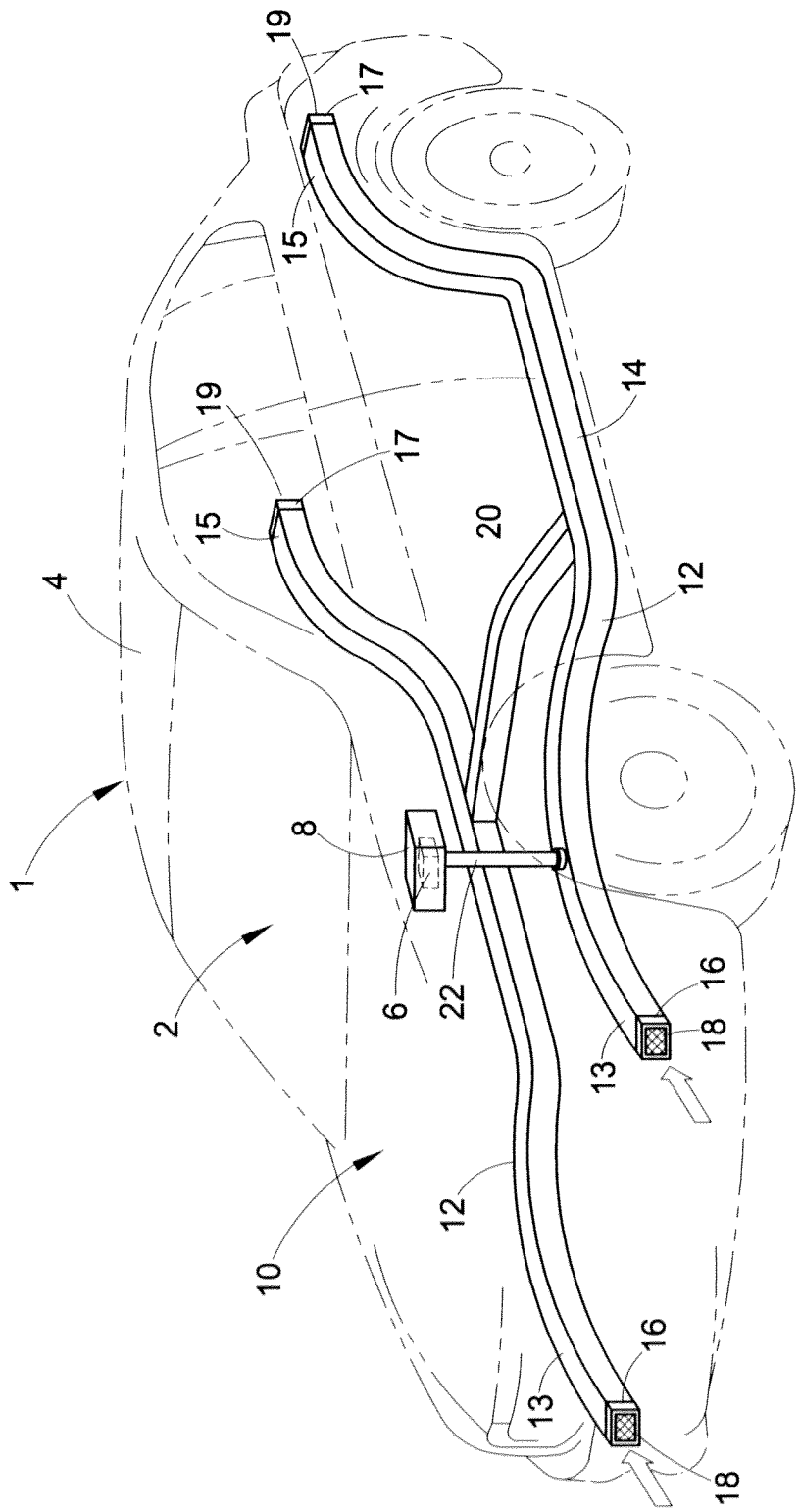
FIG. 1 is a perspective view of an automotive vehicle, partially shown in phantom.

With reference to FIG. 1, a first battery cooling embodiment is depicted. Automotive vehicle 1 includes a passenger compartment 2 enclosed by a body 4. A battery 6 is housed within a battery box 8 which is disposed within an engine compartment 10. Although the detailed description refers to a battery box, it is noted that the disclosure is not intended to be limited to the specific location of the battery within a box. Rather, the disclosure contemplates the battery disposed within a space or compartment in the vehicle into which air flow can be directed. The compartment can be fully enclosed, such as the battery box, or partially enclosed wherein fewer than six walls are provided. Furthermore, it is envisioned that one or more compartment walls can be defined by other vehicle components, such as the vehicle body wall, structural wall, or an element such as a washer fluid reservoir, as examples.

Vehicle 1 includes a pair of side frames 12 extending from the front end of the body 4 to a rear end of the body 4. The side frames 12 have a hollow cross section, and include a front side frame portion 13, a side sill 14, and the rear floor frame 15. Both the front 16 and back end 17 openings of the side frames 12 are sealed with filters 18 and 19, respectively. The filters prevent a pebble, etc. from entering into the side frames 12 through the openings 16 and 17, yet allow air to circulate through the side frames.

An air intake duct 20 is connected to the front end part of the front side sill 14. Air intake duct 20 includes conduit 22 connected to the battery box 8. In this manner, during operation of the vehicle, air is forced into the side frames 12 through the openings 16 and travels to the battery box 8 through the air intake duct 20 and conduit 22. A blower fan for inhalation of air may be provided in the side rails 12 to allow airflow to be maintained when the vehicle is not running to cool battery box 8.

To enhance the ability of the battery box to draw air from the vehicle frame it is envisioned to create one of a lower temperature air zone or a lower pressure air zone adjacent to an outlet vent or vents in the battery box. Several mechanisms exist to achieve this goal.

For example, vehicles with liquid cooled engines, such as internal combustion engines, generally mount the engine cooling heat exchanger (radiator) at the front of the engine compartment, just behind the bumper and grille, so as to take advantage of the ram air effect at high vehicle speeds. At lower vehicle speeds, an axially positioned engine cooling fan forces air through the radiator. In commercial practice, the fan is generally mounted to a support shroud that both physically secures the fan to the vehicle, and which also surrounds the fan to confine and direct the air efficiently through the radiator. While radiators are typically planar, rectangular structures, the fans are invariably circular, with blades extending radially from a central hub. Fan and fan shroud location, in actual commercial practice, is almost invariably behind the radiator, so as to pull air through the radiator.

The radiator is responsible for dispersing or radiating the heat from circulating engine coolant. The temperature of a car's engine is controlled by circulating engine coolant that picks up heat generated from engine combustion and transports it directly to a car's radiator where it is cooled and then returns to the car's engine. Without the radiator, a car's engine would quickly overheat and fail. The radiator, which is filled with small chambers and galleys through which engine coolant circulates, disperses the heat from the coolant to the outside atmosphere with the help of the radiator fan which blows or sucks supercharged air directly through the radiator.

In any radiator design, it is accepted that hot air is generated when external air passes over the cooling surface. Accordingly, the zone of the engine compartment downstream of the radiator will generally experience a relatively high temperature area. Since this zone is typically adjacent the elevated temperature surfaces of the internal combustion engine, this area is often one of the highest temperature areas within the engine compartment.

According to one embodiment of the present disclosure, it is envisioned that placing the battery box in a relatively cool region of the engine compartment can achieve a positive draw of air from the vehicle rail frame.

Figure 2:
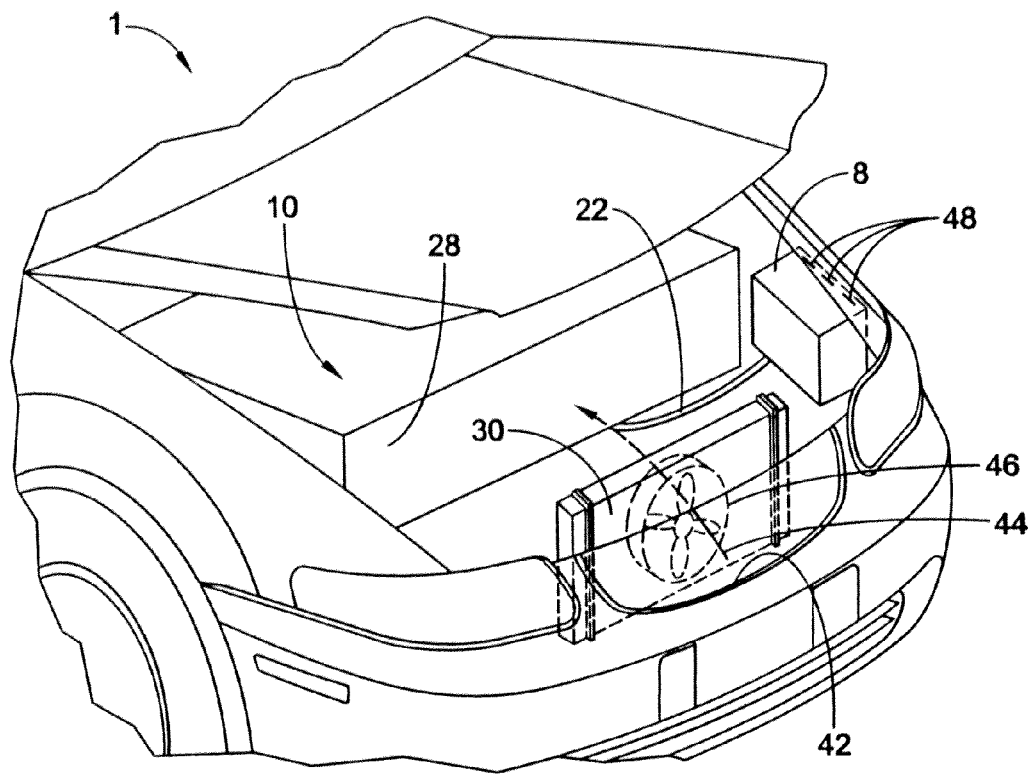
FIG. 2 is a perspective view of an automotive vehicle including a battery box vented to a relatively cool air region of an engine compartment.

Referring now to FIG. 2, an engine compartment 10 is depicted within which an internal combustion engine 28 is disposed. According to a common construction, radiator 30 is provided adjacent a front grill body 42 in the vehicle body to allow external air to pass through radiator 30 (see arrow 44) and enter engine compartment 10. As is known, as air passes through radiator 30, it is exposed to a high temperature large surface area coolant fluid containing apparatus. This results in heated air entering engine compartment 10, which is further heated as a result of the high temperature of the surfaces of internal combustion engine 28. Moreover, as is well known in the art, cooling fluid is circulated through the radiator and cooled by the passage of external air over the surface area thereof. External air can be forced into the radiator by the momentum of the car and/or via the use of the shrouded fan element 46.

Battery box 8 is positioned adjacent a relatively cool zone of the engine compartment 10. This relatively cool zone exists remote from internal combustion engine 28 and primary radiator airflow 44 and adjacent the cooling influence of an exterior wall of vehicle 1. Accordingly, by providing battery box vents 48 adjacent to this relatively cool region of engine compartment 10, a preferential flow of warm air contained with the battery box 8 to the relatively cooler engine compartment region occurs, providing a draw of significantly cooler air via conduit 22 from the side rails. Vents 48 can be formed in the top wall of battery box 8 or in one or more sidewalls at a position adjacent the top wall to enhance the natural convection of hot battery box air into the relatively cool air surrounding battery box 8. As the skilled artisan will recognize alternative relatively cool air zones will exist within the engine compartment.

As described above, air at an elevated temperature is created by the radiator fan combination. Although this high temperature air may not be particularly suited to direct battery cooling, the present disclosure contemplates use of the high velocity air generated by the fan and/or fan shroud (those terms having interchangeable meaning herein) to create a low pressure zone adjacent the battery box to facilitate drawing of heated air therefrom and replacement from a cool air source, such as the vehicle frame described above.

Figure 3:
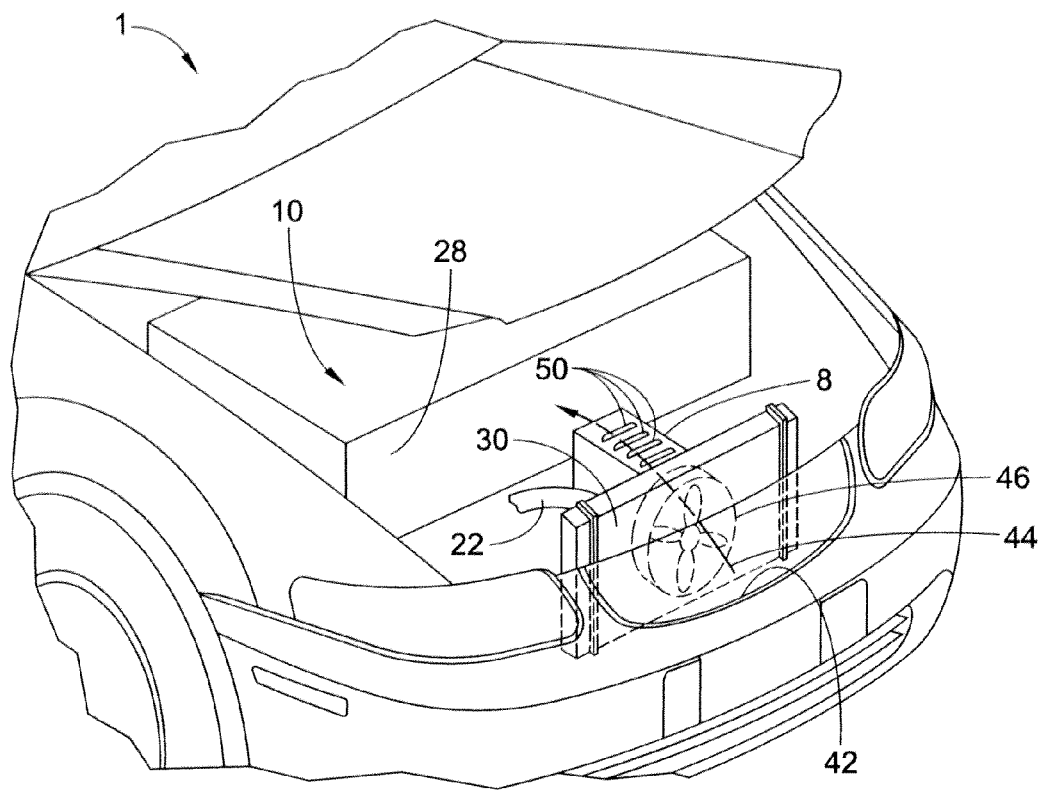
FIG. 3 is a perspective view of an automotive vehicle including a battery box disposed in a relatively high velocity airflow path.

Turning now to FIG. 3, a further alternative embodiment is depicted. More particularly, battery box 8 is positioned directly in the primary path of air flow 44 through the radiator 30. More particularly, battery box 8 is positioned immediately downstream of the shrouded radiator fan 46 such that a high velocity air flow is provided across the surface of battery box 8. The high velocity air flow creates a relatively lower pressure within battery box 8 resulting in the preferential flow of battery box air outwardly through vents 50 creating a draw of relatively cooler air via conduit 22 from side frames 12.

Figure 4:
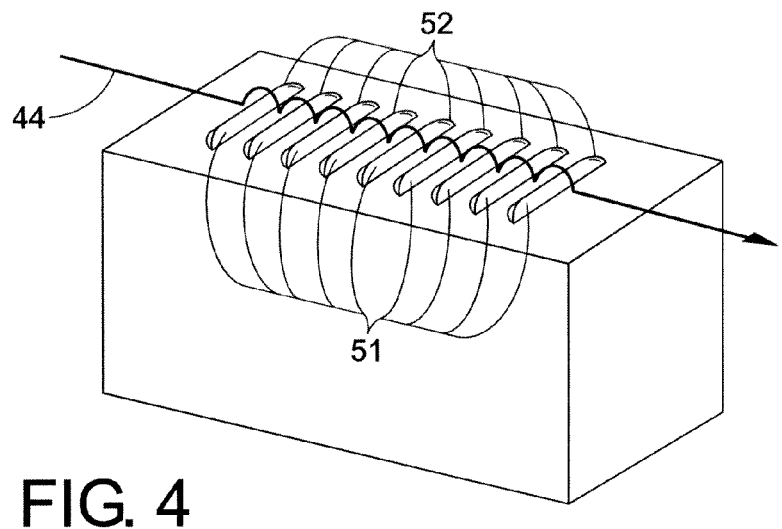
FIG. 4 is a perspective view of an alternative battery box construction.

Turning now to FIG. 4, battery box 8 can include vents 51 having adjacent elevated projections 52 which create a extended flow path 44 over the surface of battery box. Moreover, the elevated projections 52 further accelerate the velocity of air flowing over the vents 51, increasing the pressure differential between the interior (relatively high pressure) of battery box 8 and the external environment (relatively low pressure). This creates an enhanced draw of warm battery box air and a coincident pull of cooler air from side frames 12.

To maximize the effective draw of the high velocity air on the battery box 8, it is feasible to provide a battery box having a parallel-piped shape with the vents and corresponding elevated projections oriented transverse to the axis of elongation, and when installed, the direction of primary airflow 44.

Figure 5:
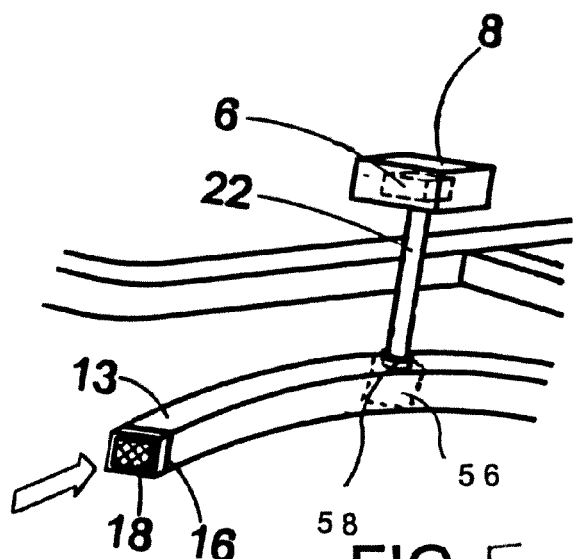
FIG. 5 is a perspective view, partially shown in phantom, of an alternative connection between the battery box and the vehicle frame.

Referring now to FIG. 5, an alternative embodiment is depicted. Moreover, front side frame portion 13 has been modified to include an air deflector 56 blocking at least a portion of the frames hollow interior downstream of a connection point 58 between front side frame portion 13 and conduit 22. In this manner, air flow within side frame 12 is forceably directed into battery box 8. Deflector 56 can take any suitable form and can fully or partially obscure the passage in side frame 12. Deflector 56 can be retained in a slot formed in the side frame 12 or can be mechanically joined thereto, such as via a weldment, or secured by any other means deemed suitable by the skilled artisan.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof

The invention claimed is:

1. A vehicle powered by an internal combustion engine comprising:
    a battery compartment;
    a battery supplying electrical energy to the internal combustion engine and residing in said battery compartment;
    a vehicle frame being at least partially hollow and having an air inlet; and
    a conduit extending between said frame and said battery compartment providing fluid communication therebetween, said battery compartment further including at least one wall having a vent.

2. The vehicle of claim 1, wherein said battery compartment comprises a housing including at least one additional wall or optionally at least one vehicle component to define a space receiving the battery.

3. The vehicle of claim 2, wherein said battery housing includes a plurality of vents.

4. The vehicle of claim 3, wherein said plurality of vents are formed in at least one sidewall adjacent a top wall of said battery housing.

5. The vehicle of claim 2 further comprising a radiator providing cooled liquid to the internal combustion engine having a shrouded fan, wherein said housing resides at least substantially within an airflow exiting said shrouded fan.

6. The vehicle of claim 5, wherein said wall having a vent further includes at least one surface having an air flow disruptive projection.

7. The vehicle of claim 6, wherein said wall having a vent comprises a top wall.

8. The vehicle of claim 6 wherein said battery housing comprises a box having parallel-piped shape and said vent is oriented transverse to the elongated axis thereof.

9. The vehicle of claim 8 wherein the elongated axis of said battery housing is oriented parallel to the primary direction of airflow exiting said shrouded fan.

10. The vehicle of claim 1, wherein said battery compartment resides within an engine compartment and adjacent an external vehicle body wall.

11. The vehicle of claim 1 further comprising an airflow deflecting element disposed within said vehicle frame to direct air into said conduit.

12. A vehicle comprising:
    a radiator providing cooled liquid to an internal combustion engine;
    a corresponding radiator fan encompassed by a fan shroud;
    a battery; and
    a battery box receiving said battery, said battery box including a vented wall positioned to receive an airflow exiting said shrouded fan, said battery box further including an inlet in fluid communication with a remote source of air.

13. The vehicle of claim 12, wherein said remote source of air comprises air from an exterior of the vehicle received through a vehicle frame.

14. The vehicle of claim 12, wherein said vented wall further includes at least one surface having an air flow disruptive projection.

15. The vehicle of claim 12 wherein said battery box comprises a parallel-piped shape and said vent is oriented transverse to the an elongated axis thereof.

16. The vehicle of claim 15 wherein the elongated axis of said battery box is oriented parallel to a primary direction of airflow exiting said shrouded fan.

17. A method of cooling a battery of a vehicle having an engine compartment housing an internal combustion engine comprising:
    providing a battery box within said engine compartment configured to house the battery;
    providing at least one at least partially hollow frame rail, said frame rail having an inlet to receive external air, and
    providing fluid communication between said frame rail and said battery box, wherein during operation of the vehicle external air is provided to said battery box via said frame rail, and air is encouraged to exit said battery box by at least one of natural convection and a pressure differential.

18. The method of claim 17 further comprising exposing said battery box to a relatively low temperature zone to create natural convection of relatively warmer air contained within said battery box, resulting in said relatively warmer air exiting said battery box and replacement of said relatively warmer air with air drawn from said frame rail.

19. The method of claim 17 further comprising:
    positioning said battery box in a relatively high velocity airflow zone within said engine compartment wherein a low pressure area is created across a surface of said battery box relative to an internal pressure such that air within said battery box is drawn outwardly and replaced with air from said frame rail.

20. The method of claim 17 further comprising venting said battery box via a plurality of vents.

21. An automotive vehicle comprising:
    a battery compartment including a top wall having vents and air flow disrupting projections;
    a battery supplying electrical energy to the vehicle, said battery residing in said battery compartment;
    a vehicle frame, said vehicle frame including an air inlet;
    a conduit in fluid communication with said vehicle frame; and
    said battery compartment further including a bottom wall defining an inlet receiving said conduit, wherein fluid can be drawn from said vehicle frame, through said conduit into said battery compartment and exit through said vents.

* * * * *